3,029,137
HERBICIDAL METHOD EMPLOYING OCTACHLOROCYCLOPENTENE
Edward D. Weil, Lewiston, Edwin Dorfman, Grand Island, and Jack S. Newcomer, Wilson, N.Y., assignors to Hooker Chemical Corporation, Niagara Falls, N.Y., a corporation of New York
No Drawing. Filed Apr. 1, 1960, Ser. No. 19,196
5 Claims. (Cl. 71—2.3)

This invention relates to the use of a chlorinated cyclopentene as a herbicide. More specifically the inventive concept of this invention resides in the use of octachlorocyclopentene as a herbicide.

Octachlorocyclopentene is a known compound which may be prepared by passing polychloropentane and chlorine over a heated catalyst. A typical known preparation for this compound is disclosed in United States Patent Number 2,714,124 which issued to Maude et al. July 26, 1955.

It was surprising to find that not only is octachlorocyclopentene valuable in both pre-emergence and post-emergence control of weeds found in soil, but is also very effective against aquatic weeds which are resistant to other herbicides. In pre-emergence use it has been found that octachlorocyclopentene inhibits dormant weed seeds, roots, and rhizomes; in post-emergence use this compound may be used by itself or in an oil to get "rapid" burning of foliage. Typical application rates that have been found desirable are in the range of five to three hundred pounds per acre depending of course on the field conditions or on the species of weed or aquatic weed to be controlled. When using octachlorocyclopentene to control aquatic weeds at least 0.1 p.p.m. in water should be used. It was further unexpected to find that octachlorocyclopentene has a short residual life and is very desirable in cases where a crop is to be planted shortly after weed infestation is eradicated by fumigation or by post-emergence methods. It was found also that another unexpected advantage in using octachlorocyclopentene as a herbicide is its ability to permeate the soil as a vapor to kill or inhibit dormant seeds, roots, tubers and rhizomes.

Since this compound has such a short residual life, it may be used post-emergence if required with a residual herbicide such as trichlorobenzoic acids, C.M.U. (which is a chlorinated phenyl urea), Simazin (which is a diethylamino chlorotriazine) and the like. As above stated octachlorocyclopentene is generally effective when applied in quantities of about five to three hundred pounds per acre. For ease of application any conventional diluent such as clay, wood flour, fuller's earth, soy-bean flour, or liquid carrier such as xylene, kerosene, alcohols and ketones or other carriers may be used, depending on the economics and distribution requirements. It may also be formulated as an emulsion in water. Formulations may contain emulsifying agents such as sorbital laurates, wetting agents such as sodium alkyl aryl sulfonate and sodium alkyl sulfate, and other carriers in accordance with the well-established practices in the herbicidal field. Combinations of this herbicide with other known herbicides or compositions for controlling the growth of vegetation and plants to obtain desirable combinations and properties are within the spirit of this invention. The compound of this invention may be as stated above advantageously used in mixtures with residual herbicides.

The following examples will further illustrate the present invention.

*Example 1*

On five feet by forty feet plots, $C_5Cl_8$ was sprayed as a dispersion in water at the rates of five, ten, twenty, forty and eighty pounds per acre. One-half of each plot was disked to a four inch depth, and the plots were then immediately planted with corn, ryegrass and millet. The soil was naturally infested with foxtails, ragweed, smartweed, lamb's quarters and pigweed.

Complete control of the broad-leaf weeds was observed at twenty pounds and higher. Good control was observed at ten pounds. Better than fifty percent control of foxtail was observed at twenty pounds. Damage to corn was observed at twenty pounds.

*Example 2*

$C_5Cl_8$ as an acetone solution was sprayed and disked in and the area then planted with millet and wild oats. The area was naturally infested with the weeds listed in Example 1. The results two weeks later were as follows:

| Species | Rates (lbs./acre) | Result |
|---|---|---|
| Millet | 50 | 100% Failure to emerge. |
| Wild Oats | 50 | Nearly normal. |
| Wild Oats | 100 | Nearly normal. |
| Wild Oats | 200 | Thinning and stunting. |
| Broad Leaf Weeds | 50 | Nearly 100% failure to emerge. |

*Example 3*

Areas infested with a variety of annual grasses as well as chicory, milkweed, ragweed, and dandelion were sprayed with various formulations of octachlorocyclopentene and inspected one week later, with the results below.

| Formulation | Lbs. $C_5Cl_8$/acre | Results |
|---|---|---|
| Kerosene solution 0.3% $C_5Cl_8$ | 2.5 | Slight Burning. |
| Kerosene solution 0.6% $C_5Cl_8$ | 5 | Partial top-kill.[2] |
| Kerosene solution 1.2% $C_5Cl_8$ | 10 | Nearly complete top-kill. |
| Kerosene solution 2.4% $C_5Cl_8$ | 20 | Complete top-kill. |
| Kerosene (control) | 0 | No effect. |
| Emulsion [1] in water | 5 | Slight Burning. |
| Do | 10 | Slight Burning. |
| Do | 20 | Partial top-kill. |
| Do | 40 | Nearly complete top-kill. |
| Do | 80 | Complete top-kill. |
| Xylene-water control | 0 | No effect. |

[1] Containing three parts xylene, 0.5 part Atlox 3335 emulsifier, and 0.16 part Atlox 8916P emulsifier per part of $C_5Cl_8$.
[2] Top-kill=death of above-ground portions of plants.

*Example 4*

Soil heavily infested with Johnsongrass seed was sprayed with octachlorocyclopentene dissolved in a non-phytotoxic solvent (acetone), at the rates of twenty, fifty and one hundred pounds per acre of active ingredient. No emergence of Johnsongrass seedlings occurred in any of the treated soil, whereas an untreated control area developed a heavy infestation of Johnsongrass seedlings.

*Example 5*

Octachlorocyclopentene and various known herbicides were dispersed at the rate of five parts per million in water in which filamentous algae, potamogeton, elodea, and water stargrass were growing. After three weeks, the following percentages of kill were observed.

Chemicals:                                     Control (percent)
Octachlorocyclopentene _____ 98
2,4-dichlorophenoxyacetic acid [1] _____ 47
Trichloroacetic acid [2] _____ 36
2,3,5,6-tetrachlorobenzoic acid _____ 37

[1] Formulated as phenyl ester.
[2] Formulated as glycol ester.

It should be understood that the invention is not limited to the specific examples which have been offered merely as illustrative, and that modifications may be made within

We claim:
1. A method for the control of weeds which comprises applying to the media to be treated a composition comprising a phytotoxic amount of octachlorocyclopentene.
2. A method for the control of weeds which comprises applying to the media to be treated from five to two hundred pounds per acre of octachlorocyclopentene.
3. A method for the control of Johnsongrass which comprises applying to the media to be treated from five to two hundred pounds of octachlorocyclopentene.
4. A method for the control of aquatic weeds which comprises applying to the water to be treated about five parts of octachlorocyclopentene per million parts of water.
5. A method for the control of weeds which comprises applying a phytotoxic amount of a solution containing at least 0.3 percent of octachlorocyclopentene in a petroleum oil to the locus to be treated.

References Cited in the file of this patent
UNITED STATES PATENTS
2,713,535     Patrick _____ July 19, 1955

OTHER REFERENCES
Levinson in "Chemical Abstracts," vol. 51, 1957, col. 18, 442(i).